United States Patent
Brunneke et al.

(10) Patent No.: US 11,739,790 B2
(45) Date of Patent: Aug. 29, 2023

(54) BALL JOINT FOR A VEHICLE, IN PARTICULAR FOR AN OFF-ROAD VEHICLE

(71) Applicant: ZF Friedrichshafen AG, Friedrichshafen (DE)

(72) Inventors: Hans-Gerd Brunneke, Georgsmarienhuette (DE); Ulrich Kalmey, Stemwede (DE); Heinfried Helms, Bad Essen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 1078 days.

(21) Appl. No.: 16/072,197

(22) PCT Filed: Dec. 19, 2016

(86) PCT No.: PCT/EP2016/081666
§ 371 (c)(1),
(2) Date: Jul. 24, 2018

(87) PCT Pub. No.: WO2017/129321
PCT Pub. Date: Aug. 3, 2017

(65) Prior Publication Data
US 2019/0032703 A1 Jan. 31, 2019

(30) Foreign Application Priority Data
Jan. 26, 2016 (DE) ...................... 10 2016 201 046.8

(51) Int. Cl.
*F16C 11/06* (2006.01)
*F16J 3/04* (2006.01)

(52) U.S. Cl.
CPC ............ *F16C 11/0671* (2013.01); *F16J 3/043* (2013.01); *F16C 2326/05* (2013.01); *Y10T 403/315* (2015.01)

(58) Field of Classification Search
CPC .............. F16C 11/0666; F16C 11/0671; F16C 11/0676; F16J 3/04; F16J 3/041;
(Continued)

(56) References Cited

U.S. PATENT DOCUMENTS 3,011,811 A * 12/1961 Haller ................. F16C 11/0609
403/37
3,381,987 A * 5/1968 Husen ................. F16C 11/0671
277/635
(Continued)

FOREIGN PATENT DOCUMENTS

DE 102007035654 2/2009
DE 102012014799 1/2014
(Continued)

*Primary Examiner* — Josh Skroupa
*Assistant Examiner* — Kevin J Baynes
(74) *Attorney, Agent, or Firm* — Cozen O'Connor

(57) ABSTRACT

A ball joint (20) for a vehicle, in particular for an off-road vehicle. The ball joint (20) has a housing (21) and a ball stud (22) which is rotatably and pivotably mounted in the housing (21) and which, with a shaft (23), extends out of an opening of the housing (21). The housing opening is protected against unwanted penetration of dirt and/or moisture by f a seal bellows (25). The seal bellows (25) is surrounded in some areas by a bellows protection (30) in order to prevent damage to the seal bellows (25) due to mechanical influence.

13 Claims, 4 Drawing Sheets

(58) Field of Classification Search
CPC .... F16J 3/042; F16J 3/043; F16J 3/048; F16J 3/045; F16J 3/046; Y10T 403/31; Y10T 403/315; Y10T 403/32729; F16D 3/843; F16D 3/845; F16D 3/848; F16D 2003/846
USPC ........ 277/634, 635, 636; 464/173, 174, 175; 74/18, 18.1, 18.2
See application file for complete search history.

(56) References Cited

U.S. PATENT DOCUMENTS

| | | | | |
|---|---|---|---|---|
| 3,451,700 | A * | 6/1969 | Smith | B62D 7/16 277/928 |
| 3,842,621 | A * | 10/1974 | Mazziotti | F16D 3/224 464/171 |
| 4,573,693 | A * | 3/1986 | Nakata | F16D 3/845 277/636 |
| 4,597,745 | A * | 7/1986 | Orian | B23Q 11/0816 277/634 |
| 5,100,254 | A * | 3/1992 | Wasada | F16C 11/0671 403/22 |
| 5,145,191 | A * | 9/1992 | Stewart | F16J 3/043 277/636 |
| 5,312,300 | A | 5/1994 | McGregor | |
| 5,346,431 | A * | 9/1994 | Okuyama | F16D 3/848 464/171 |
| 5,412,431 | A * | 5/1995 | Vogel | H04N 19/176 375/240.03 |
| 5,484,218 | A * | 1/1996 | Fellows | B62D 7/166 277/635 |
| 6,085,797 | A * | 7/2000 | Grabaum | C08J 7/043 138/121 |
| 6,386,551 | B1 * | 5/2002 | Martin | B29C 48/335 277/634 |
| 6,464,233 | B1 * | 10/2002 | Oetiker | F16J 3/042 277/636 |
| 6,935,378 | B2 * | 8/2005 | Ikemoto | B29D 23/001 138/121 |
| 7,753,801 | B2 * | 7/2010 | Umekida | B60B 27/0094 464/175 |
| 7,997,988 | B2 * | 8/2011 | Wormsbaecher | F16D 3/2237 464/145 |
| 8,088,015 | B2 * | 1/2012 | Kwon | B29C 73/22 464/173 |
| 2003/0144060 | A1 * | 7/2003 | Fuchs | F16D 3/845 464/175 |
| 2004/0017046 | A1 * | 1/2004 | Frazer | F16J 3/042 277/391 |
| 2005/0036827 | A1 * | 2/2005 | Bohne | F16C 11/0671 403/12 |
| 2005/0051973 | A1 | 3/2005 | Wang | |
| 2009/0028632 | A1 | 1/2009 | Brunneke | |

FOREIGN PATENT DOCUMENTS

| | | | |
|---|---|---|---|
| EP | 0093937 A1 * | 11/1983 | |
| FR | 3050249 A1 * | 10/2017 | |
| GB | 892025 A * | 3/1962 | .......... F16C 11/0671 |
| JP | 59147166 A * | 8/1984 | .............. F16J 3/043 |
| JP | 60172772 A * | 9/1985 | .............. F16J 3/043 |
| JP | H01229120 | 9/1989 | |
| WO | WO-0242653 A1 * | 5/2002 | .......... F16C 11/0671 |
| WO | WO-2004038237 A1 * | 5/2004 | ............. F16D 3/845 |

* cited by examiner

BALL JOINT FOR A VEHICLE, IN PARTICULAR FOR AN OFF-ROAD VEHICLE

PRIORITY CLAIM

This is a U.S. national stage of application No. PCT/EP2016/081666, filed on Dec. 19, 2016. Priority is claimed on the following application(s): Country: Germany, Application No.: 10 2016 201 046.8, filed: Jan. 26, 2016, the content of which is/are incorporated herein by reference in its entirety.

FIELD OF THE INVENTION

The present invention is directed to a ball joint for a vehicle, in particular for an off-road vehicle, including a seal bellows, and a bellows protection to prevent damage to the seal bellows due to mechanical influence.

BACKGROUND OF THE INVENTION

Ball joints for vehicles, in particular for off-road vehicles, are known from the prior art. US Publ. Appl US2009028632 discloses a ball joint for an agricultural or forestry tractor, a Unimog or a vehicle for military uses, wherein the ball joint has a housing and a ball stud which is mounted in the housing so as to be rotatable and pivotable. The ball stud extends out of an opening of the housing and has a conical shaft and a joint ball which is arranged inside of the housing. The housing opening is protected against unwanted penetration of dirt and/or moisture by a seal bellows. The seal bellows has an end on the stud side which is associated with the ball stud and abuts the conical outer circumferential surface of the shaft, and an end on the housing side which is fixed to the outer circumferential surface of the housing. In order to protect the seal bellows against damage from external mechanical influence, for example, stones, branches or the like sharp-edged hindrances, a separate protective covering is placed over the seal bellows. The protective covering can itself be formed as a loose steel ring mesh or as a steel-fiber fabric or carbon-fiber fabric. It is stated in the specification that the protective covering itself is elastic, but the word "elastic" must be understood within the context of the publication to mean "flexible" because the aforementioned materials do not have any recovery properties, that is, they do not substantially revert to the initial position after being deformed.

The protective covering is formed as a sleeve covering and covers the entire circumference of the seal bellows in the manner of a cape which is in itself flexible. External spring rings, for example, elastic rubber rings, are used to bring the protective covering in contact with the outer circumferential surface of the seal bellows in the mounted state. The spring rings press the protective covering, which is not inherently dimensionally stable, into radially inwardly facing, waisted corrugations of the seal bellows so as to follow the drape of the seal bellows. However, experience has shown that this pressing action of the spring rings or rubber rings relents over the course of time. Further, the spring rings can tear over the course of time and represent a cost factor in terms of their sale price as well as the cost of mounting them. Further, spring rings can be pulled away from the protective covering during driving operation, particularly during off-road driving, for example, by branches. The protective covering must be fixed in position at its end on the stud side by a clamping ring so as not to slip down from the seal bellows due to its own weight. Connecting the protective covering to the clamping ring is cumbersome because the rings of the steel ring mesh at the stud end side must be tightened on the clamping ring individually. The steel ring mesh and the steel-fiber fabric or carbon-fiber fabric have a tendency towards unwanted soiling or dirt deposits particularly in off-road driving operation. The steel ring mesh can be made of Cr—Ni stainless steel. This material and the production of the steel ring mesh are relatively expensive.

It is thus an object of the present invention to provide a relatively advantageous protective arrangement for protecting the seal bellows from damage through mechanical influence.

SUMMARY OF THE INVENTION

Accordingly, the present invention provides a ball joint for a vehicle, in particular for an off-road vehicle, which ball joint has a housing and a ball stud which is mounted in the housing so as to be rotatable and pivotable and which, with a shaft, extends out of an opening of the housing. The housing opening is protected against unwanted penetration of dirt and/or moisture by a seal bellows. According to the invention, the seal bellows is enclosed in some areas by a bellows protection in order to prevent damage to the seal bellows due to mechanical influence. Field tests have shown that damage due to mechanical influence does not occur with the same likelihood at all points on the outer surface of the seal bellows. Particularly in areas in which there is a large gap between the seal bellows and the ball stud or between the seal bellows and the housing, the risk of damage to the seal bellows during driving operation, in particular during off-road driving operation, is relatively slight. The reason for this is that, for example, branches or sharp stones striking the seal bellows press into the seal bellows but do not press against a fixed component part such as the ball stud or the housing.

Therefore, simply pressing into the seal bellows does not lead to damage to the seal bellows, where "damage" in this case means an at least partial destruction of the seal bellows with the result that the seal bellows has a breach through which lubricant which is required for lubricating the ball joint and which is enclosed by the seal bellows can escape. Further, as a result of a damaged seal bellows, dirt and/or moisture can penetrate into the area in which the ball stud is rotatably and pivotably mounted with a joint ball in the housing and can accordingly contaminate the bearing support, which is highly likely to lead to premature failure of the ball joint. The bellows protection is configured as a function of the probability of damage to the seal bellows and only surrounds an area of the seal bellows which is at a higher risk of damage. The bellows protection can be constructed relatively advantageously in this manner.

When it is stated that the bellows protection surrounds the seal bellows, this means that the inner circumferential surface of the bellows protection at least substantially contacts an outer circumferential surface of the seal bellows. The bellows protection preferably has an outer lateral surface which is extensively closed and which is formed so as to be at least substantially rotationally symmetrical in the undeflected state of the ball stud. The bellows protection preferably has axially opposed front sides having in each instance a recess which is circular in particular. When it is stated that the bellows protection partially surrounds the seal bellows, this means that the bellows protection surrounds only a partial area of the outer circumferential surface of the seal bellows or, in other words, that the inner circumferential surface of the bellows protection is smaller than the outer circumferential surface of the seal bellows. In an advantageous manner, the inner circumferential surface of the bellows protection does not extend beyond the outer circumferential surface of the seal bellows in the mounted state.

The ball joint is suited in particular for use in off-road vehicles in which there is the risk during off-road driving operation that the seal bellows will be damaged by external mechanical influence, for example, by stones, branches or the like sharp-edged hindrances. Off-road vehicles of this kind may be mobile work machinery such as, for example, agricultural and forestry tractors, including Unimogs, self-driving harvesters, self-driving construction site vehicles such as, for example, dump trucks, or military vehicles. The ball joint can be formed as axial ball joint, in particular supporting joint, or as angular ball joint which is also known as radial ball joint. The installation location for the ball joint is in the area of the chassis, in particular locations which are accessible to branches, stones or tree stumps, for example. The ball joint may be part of a single wheel suspension or a beam axle or a steering linkage, for example, and can be installed in a two-point suspension arm or a three-point suspension arm. The suspension arms can be constructed, for example, as tie rods, tracking arms, transverse suspension arms, longitudinal suspension arms or diagonal suspension arms. The seal bellows preferably sealingly contacts the shaft with a shaft contact region on one end and sealingly contacts the housing by a housing contact region on the other end. The bellows protection surrounds the seal bellows in an encircling area which extends in axial direction of the ball joint in direction of the shaft contact region proceeding from the housing contact region. The seal bellows contacts the housing by its housing contact region. The housing contact region is a partial area of the inner circumferential surface of the seal bellows. The area of the outer circumferential surface of the seal bellows surrounding the housing contact region forms a circumferential contact surface for the bellows protection. The bellows protection contacts this circumferential contact surface with a seal bellows contact region. The housing contact region and the seal bellows contact region are housing-side end portions of the inner surfaces of the seal bellows and bellows protection, respectively. The housing-side ends of the seal bellows and of the bellows protection are advantageously arranged to be flush in axial direction. Within the meaning of the invention, the axial direction of the ball joint means the axial direction of the undeflected ball stud. If the ball stud is constructed so as to be rotationally symmetrical, the axial direction of the ball stud coincides with the rotational axis of the ball stud. When the ball stud is not deflected, the axial direction of the ball joint coincides with the axial direction of the seal bellows and of the bellows protection.

The bellows protection is advisably encircled by devices that act through clamping which press the bellows protection and the seal bellows jointly against a circumferential contact region of the housing. The area of the outer circumferential surface of the bellows protection that surrounds the seal bellows contact region is encircled by the clamping device which is advantageously formed as a clamping strip. The seal bellows and the bellows protection can be secured in this way at their housing-side ends by individual clamping device. The circumferential contact region of the housing is advantageously formed as a circumferential annular groove to prevent the seal bellows coming loose from the housing.

In an advantageous further development, the bellows protection is dimensionally stable and elastic at the same time. In this context, a dimensionally stable construction means that the bellows protection, as individual part, is at least stable enough in itself that it does not collapse due to its own weight when placed on a flat surface in contrast to the prior art protective covering described in the introductory part. Within the meaning of the invention, an elastic construction means that the bellows protection has recovery properties which cause the bellows protection to strive to return to its original position after a deformation resulting from a deflection of the ball stud. Owing to its dimensionally stable and simultaneously elastic construction, the bellows protection can surround the seal bellows in the encircling area without requiring further auxiliary devices, for example, the spring rings or rubber rings mentioned in the introductory part. Further, because of the dimensionally stable construction of the bellows protection, no further clamping device apart from the housing-side clamping strip described above are required to hold the bellows protection in position relative to the seal bellows. A stud-side clamping ring which is known from the prior art and was described above can be omitted.

In an advantageous manner, the bellows protection by itself is contoured in axial direction of the ball joint. When it is stated that the bellows protection is contoured "by itself", this means that the bellows protection is formed so as to be contoured without further auxiliary device in contrast to the sleeve covering described above which, by itself, is formed as an uncontoured cape which hangs down from a seal bellows and which is only contoured with the help of spring rings or rubber rings. The contour of the bellows protection can be formed such that it has at least one partial area which is curved radially outward or radially inward and which extends in axial direction of the bellows protection, and the axial direction of the bellows protection corresponds to the axial direction of the ball joint.

The bellows protection preferably has at its outer circumferential surface two mold release fins extending in axial direction of the ball joint. The contoured construction of the bellows protection can be carried out such that the bellows protection has geometric regions which are undercut in axial direction of the bellows protection, also referred to as undercuts. In this context, "undercuts" designate geometric regions at a structural component part which are produced by creative forming and prevent the removal of the structural component part from the master mold after completion of the structural component part. The bellows protection is preferably produced by a creative forming process, in particular by injection molding. When the bellows protection has undercuts in its axial direction, demolding must be carried out, possibly in radial direction, depending on the type and scope of the undercuts and depending on the elasticity of the material to be demolded, because there are no undercuts in this direction owing to the preferably rotationally symmetrical shape of the bellows protection. A split injection mold with a sturdy, at least substantially rotationally symmetrical core is advantageously used to produce the bellows protection. In this case, the mold release fins are arranged at the outer circumferential surface of the bellows protection opposite one another in radial direction and extend in a mold release plane passing through the center axis of the bellows protection.

According to an advantageous embodiment, a wall of the seal bellows has a zigzag shape in some areas in axial direction of the ball joint. Within the meaning of the present invention, "zigzag shape" means a bellows-like shape formed by a series of adjoining turns which are also curved in opposite directions. In this context, "turn" means a portion or area with a zigzag shape and a change in direction.

The seal bellows has at least one bulged portion which is curved radially outward and one waisted portion directly adjoining it which is curved radially inward in contrast to a seal bellows with a spherical outer surface, also known as onion bellows owing to its shape. When the shaft is deflected, the zigzag shape brings about a deformation of the seal bellows which is gentle because it is concertina-like and, therefore, the seal bellows deforms without buckling.

Advisably, the seal bellows and the bellows protection at least substantially correspond to one another with respect to shape in the encircling area. The bellows protection follows the shape of the seal bellows circumferentially. Owing to the fact that, beyond this, the bellows protection is configured to be dimensionally stable and simultaneously elastic, the bellows protection is relatively easy to mount compared to the solution with the prior art protective covering which was described in the introductory part. When the bellows protection and the seal bellows at least substantially correspond to one another with respect to shape, the bellows protection can hold itself in the mounted position solely by positive engagement after being placed over the seal bellows. Further, a deformation of the seal bellows and bellows protection which is sparing of material and force results during a deflection of the ball stud because, owing to the correspondence in shape, the deformation properties of the two structural component parts are also at least substantially coextensive in the encircling area. This means that the opposite areas or contacting areas of the seal bellows and bellows protection behave at least approximately identically during a deflection of the ball stud given an advantageous choice of material.

The seal bellows advantageously has a bulged portion which adjoins the housing, extends in axial direction of the ball joint in direction of the shaft contact region and is encircled by the bellows protection. As a result of the radially outwardly extending bulging, the bellows protection retains its position in axial direction by an at least substantially positively engaging encirclement. In this way, branches, for example, cannot easily push the bellows protection away from the encircled bulged portion during driving operation.

A further development of the invention provides that the bellows protection is arranged inside of the bulged portion so as to be spaced apart from the seal bellows. The gap is preferably circumferential and is arranged inside of the bulged portion, particularly in the region of the greatest outer diameter of the seal bellows and, therefore, in the region of the greatest inner diameter of the bellows protection. The gap and the air volume enclosed as a result and the elasticity of the bellows protection bring about an additional damping effect in the manner of shock absorption which offers further protection for the seal bellows. Further, the friction between the outer surface of the seal bellows and the inner surface of the bellows protection is minimized during a deflection of the ball stud as a result of the gap.

The bellows protection preferably contacts the seal bellows extensively by its axial end portion remote of the seal bellows contact region. This effectively prevents a penetration of solid particles, e.g., small stones, which could lead to damage to the seal bellows and/or damage to the bellows protection through abrasion during driving operation.

Further, it is preferable that the axial end portion of the bellows protection is circumferentially joined to the seal bellows by bonding, in particular glued or welded. As a result of the end portion of the bellows protection being fixed to the seal bellows, it is reliably ensured that the bellows protection cannot shift inside of the encircling area in axial direction relative to the seal bellows, for example, under the influence of branches, so that the seal bellows would not be protected from external mechanical influences inside the entire encircling area. Further, this step reliably prevents small stones or other undesirable foreign bodies from penetrating into the encircling area between the seal bellows and the bellows protection. In spite of the partial bonding engagement, however, the seal bellows and the bellows protection are basically two separate structural component parts.

Referring to their material composition, the seal bellows and the bellows protection are advantageously produced from the same material. During a deflection of the ball stud, the seal bellows and the bellows protection are deformed in approximately the same way when configured so as to correspond in shape. Using the same material to produce both of the structural component parts mentioned above prevents unwanted effects brought about by inhomogeneous material properties, for example, a partial increase in friction or area pressure and a consequent increased wear. The materials for the seal bellows and the bellows protection may differ with respect to their technical characteristics such as tensile strength, elasticity, stretching capacity and/or hardness. For example, the seal bellows can have a Shore hardness of 75 and the bellows protection can have a Shore hardness of 95. However, the invention can also be implemented with a seal bellows and a bellows protection having a different material composition and/or identical technical characteristics.

The bellows protection is advisably made of a plastic with rubber-like characteristics, particularly polyurethane (PUR). Polyurethane has a higher tensile strength compared to elastomers and therefore offers excellent resistance to external mechanical influences as a material for the bellows protection. The bellows protection can be provided additionally with a woven insert to increase resiliency. It must be ensured within the framework of the design of the component parts that a demolding of the bellows protection is possible when the bellows protection is produced by injection molding in a mold with a heavy-duty core. When the seal bellows and the bellows protection are welded together in the area of the end portion of the bellows protection, it is advantageous to produce the seal bellows from polyurethane as well so as to enhance the durability of the weld by using identical materials for the parts to be joined. Alternatively, the bellows protection can also be produced from an elastomer material.

The invention is further directed to a seal bellows for a ball joint such as that described above in which the seal bellows is partially surrounded by a bellows protection for preventing damage to the same from mechanical influence.

The invention is further directed to a bellows protection for a ball joint such as that described above in which the bellows protection serves to partially surround the seal bellows.

BRIEF DESCRIPTION OF THE DRAWINGS

The invention will be described more fully in the following with reference to figures showing only an embodiment. Like reference numerals designate like component parts or elements. In the drawings.

DETAILED DESCRIPTION OF THE PRESENTLY PREFERRED EMBODIMENTS

Figure 1:
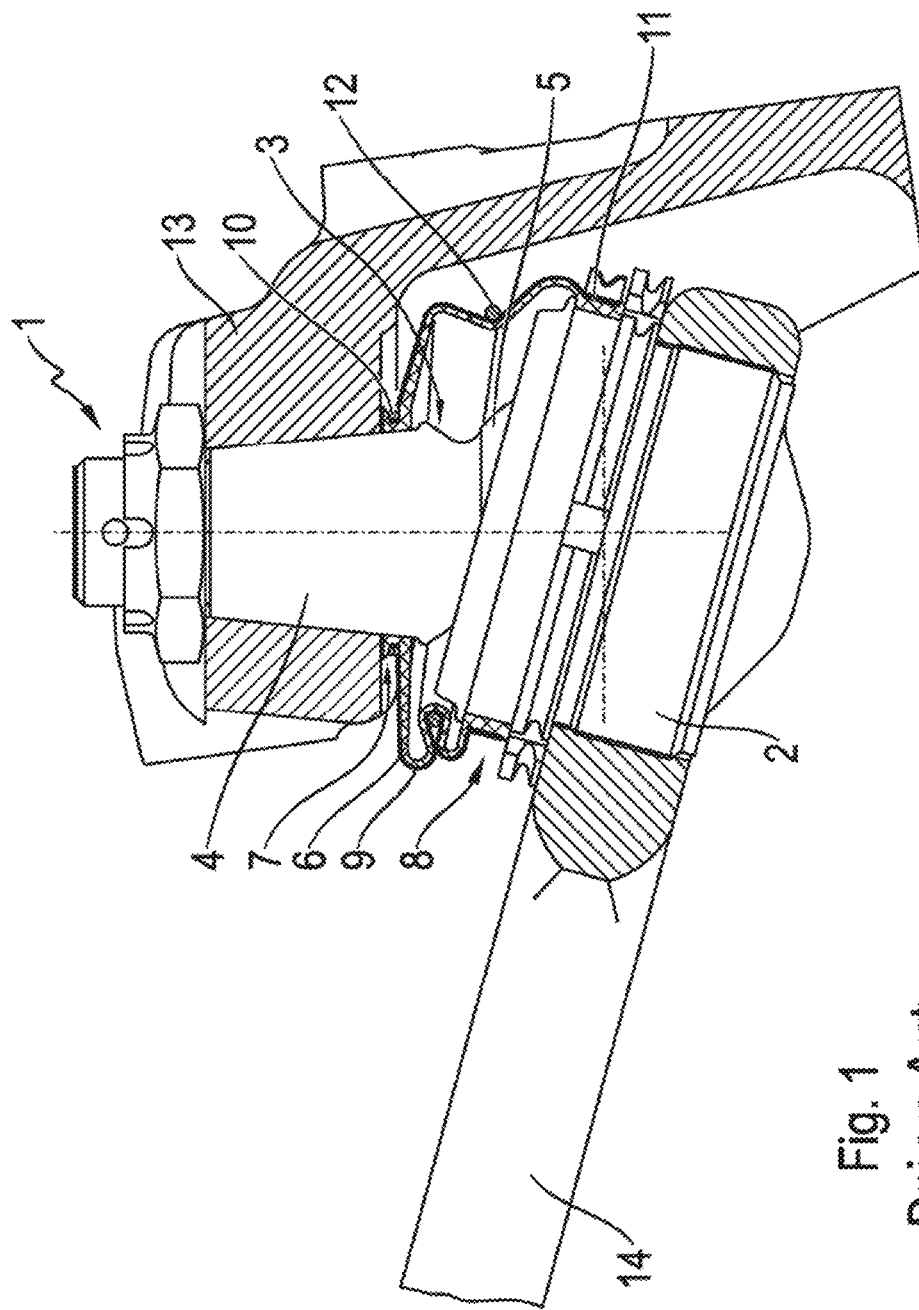
FIG. 1 shows a sectional view of a ball joint according to the prior art.

FIG. 1 shows a ball joint known from the prior art which is formed as a so-called supporting joint 1. The ball joint 1 has a housing 2 and a ball stud 3 which is rotatably and pivotably mounted in the housing 2. The ball stud 3 extends out of an opening of the housing 2 and has a conical shaft 4 and a joint ball 5, only partially visible, arranged inside of the housing 2. The housing opening is protected against unwanted penetration of dirt and/or moisture by a seal bellows 6. The seal bellows 6 has a stud-side end 7 which abuts the conical outer circumferential surface of the shaft 4 and a housing-side end 8 which is fixed to the outer circumference of the housing 2. A separate protective covering 9 is fitted over the seal bellows 6 in order to protect the seal bellows 6 against damage from external mechanical influence. The protective covering 9 is fixed at its stud-side end 7 to the seal bellows 6 by a clamping ring 10. The protective covering 9 is fastened at its housing-side end 8 to the seal bellows 6 by a clamping strip 11. The protective covering 9 is pressed against the seal bellows 6 by a spring ring 12 in a waisted, inwardly curved portion of the seal bellows 6. The supporting joint 1 is connected to a wheel support 13 via shaft 4 and to a transverse suspension arm 14 via housing 2.

Figure 2:
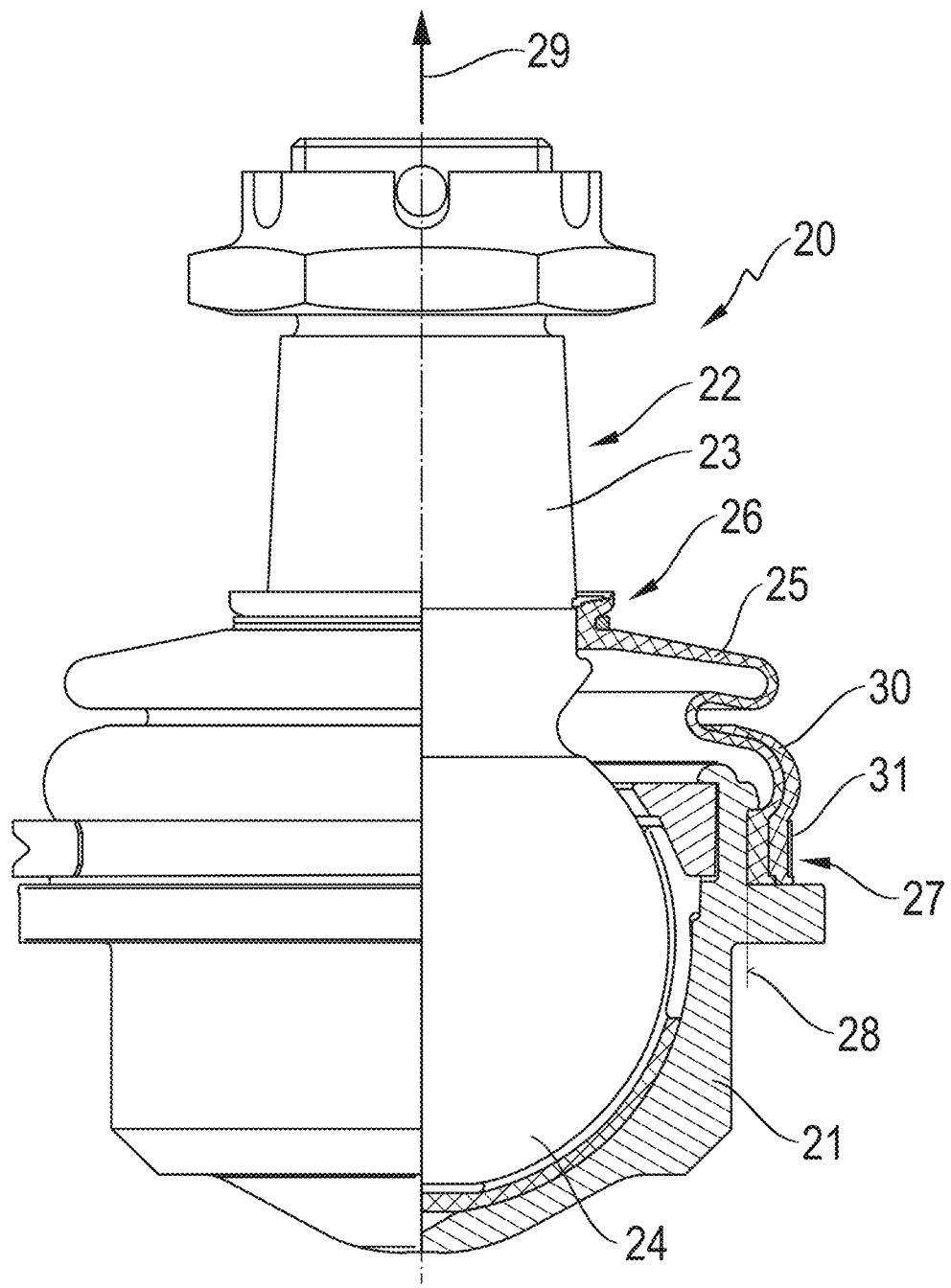
FIG. 2 shows a partial sectional view of a ball joint according to the present invention.

FIG. 2 shows a ball joint 20 having a housing 21 and a ball stud 22 which is rotatably and pivotably mounted in housing 21. The ball stud 22 extends out of an opening of housing 21 and has a conical shaft 23 and a joint ball 24. The joint ball 24 is arranged inside of housing 21. The housing opening is protected against unwanted penetration of dirt and/or moisture by a seal bellows 25. The seal bellows 25 has a stud-side end 26 which faces the shaft 23 of the ball stud 22 and which abuts the conical outer circumferential surface of shaft 23 and has a housing-side end 27 which is fixed to a circumferential contact region 28 of the housing 21. The rotational axis of the ball stud 22, shown in the undeflected position, coincides with the axial direction 29 of ball joint 20. In order to prevent damage to the seal bellows 25 due to mechanical influence, the seal bellows 25 is partially enclosed by a bellows protection 30. At its housing-side end 27, the seal bellows 25 is aligned flush with the bellows protection in axial direction 29. In this area, the seal bellows 25 and the bellows protection 30 are surrounded by a clamping device formed as a clamping strip 31 and are jointly pressed against the circumferential contact region 28 of the housing 21.

Figure 3:
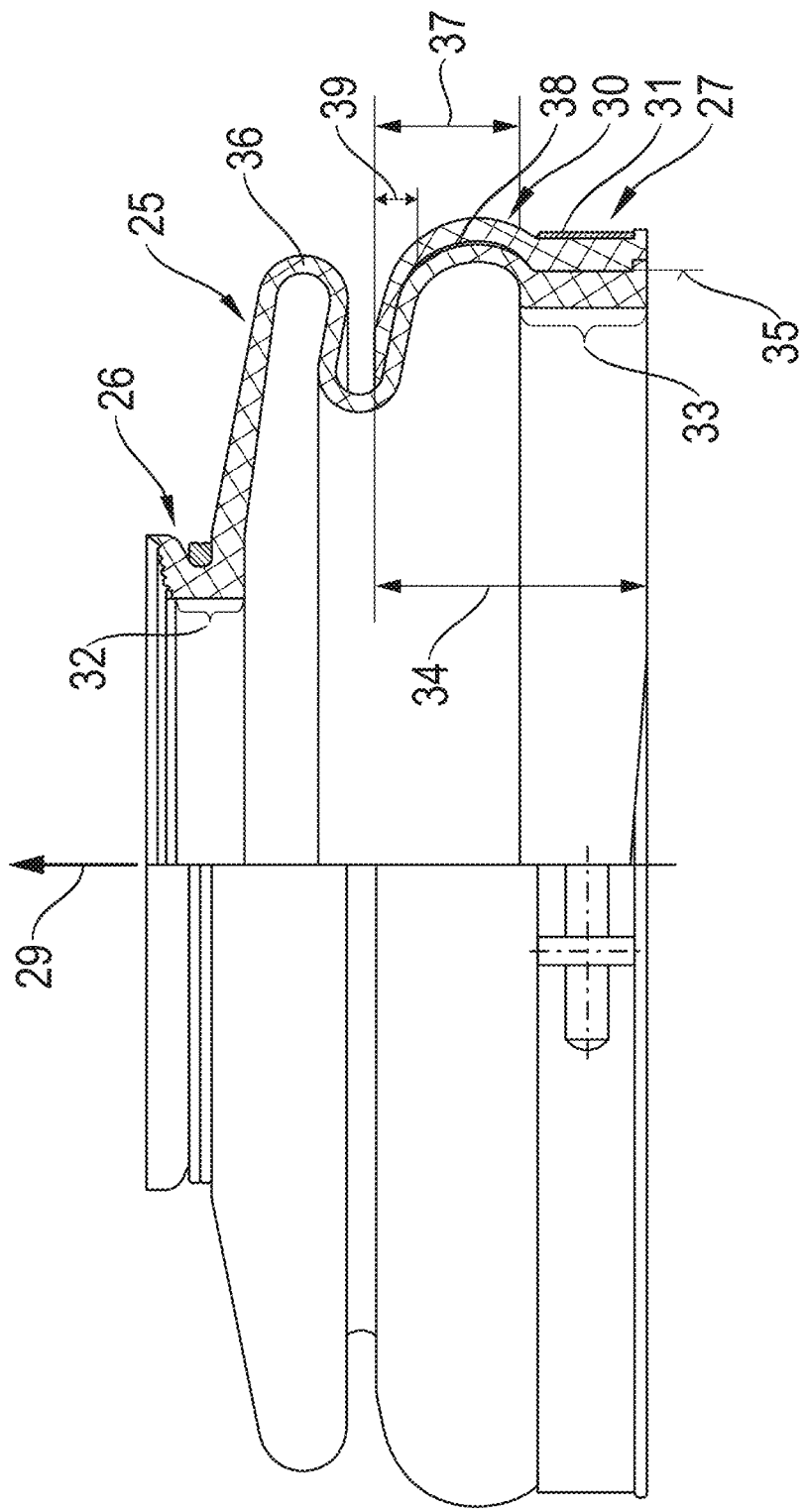
FIG. 3 shows a partial sectional view of a seal bellows and a bellows protection from FIG. 2.

FIG. 3 shows the seal bellows 25 for the ball joint 20. To prevent damage to the seal bellows 25 from mechanical influence, the latter is partially surrounded by the bellows protection 30. A subassembly of this kind can be a replacement parts package, for example. The seal bellows 25 has at its stud-side end 26 a shaft contact region 32 which is part of the inner circumferential surface of the seal bellows 25 and sealingly contacts the shaft 23. At its housing-side end 27, the inner circumferential surface of the seal bellows 25 sealingly contacts the circumferential contact region 28 of the housing 21 by a housing contact region 33. The bellows protection 30 surrounds the seal bellows 25 in an encircling area 34 which extends in axial direction 29 of ball joint 20 in direction of the shaft contact region 32 proceeding from the housing contact region 33. The area of the outer circumferential surface of the seal bellows 25 that surrounds the housing contact region 33 forms a circumferential contact surface for the bellows protection 30. The bellows protection 30 contacts this circumferential contact surface by a seal bellows contact region 35 which is part of the inner circumferential surface 42 of the bellows protection 30. The seal bellows 25 and the bellows protection 30 are configured in the encircling area 34 so as to substantially correspond to one another with respect to shape.

A wall 36 of the seal bellows 25 extends in a zigzag shape in some areas in axial direction 29 of the ball joint 20. The seal bellows 25 has a bulged portion 37 which adjoins the housing 21, extends in axial direction 29 of the ball joint 20 in direction of the shaft contact region 32 and is encircled by the bellows protection 30. The bellows protection 30 is arranged in the bulged portion 37 so as to be spaced apart from the seal bellows 25, the gap 38 within the bulged portion 37 having a maximum in the area of the largest diameter of the seal bellows 25. The bellows protection 30 extensively contacts the seal bellows 25 by its axial end portion 39 remote of the seal bellows contact region 35. The clamping strip 31 encircles the housing-side end portion of the bellows protection 30 and presses it with the seal bellows contact region 35 against the housing-side end portion of the seal bellows 25. The clamping force exerted by the clamping strip 31 is transmitted from the housing-side end portion of the seal bellows 25 via the housing contact region 33 to the circumferential contact region 28 of the housing 21.

Figure 4:
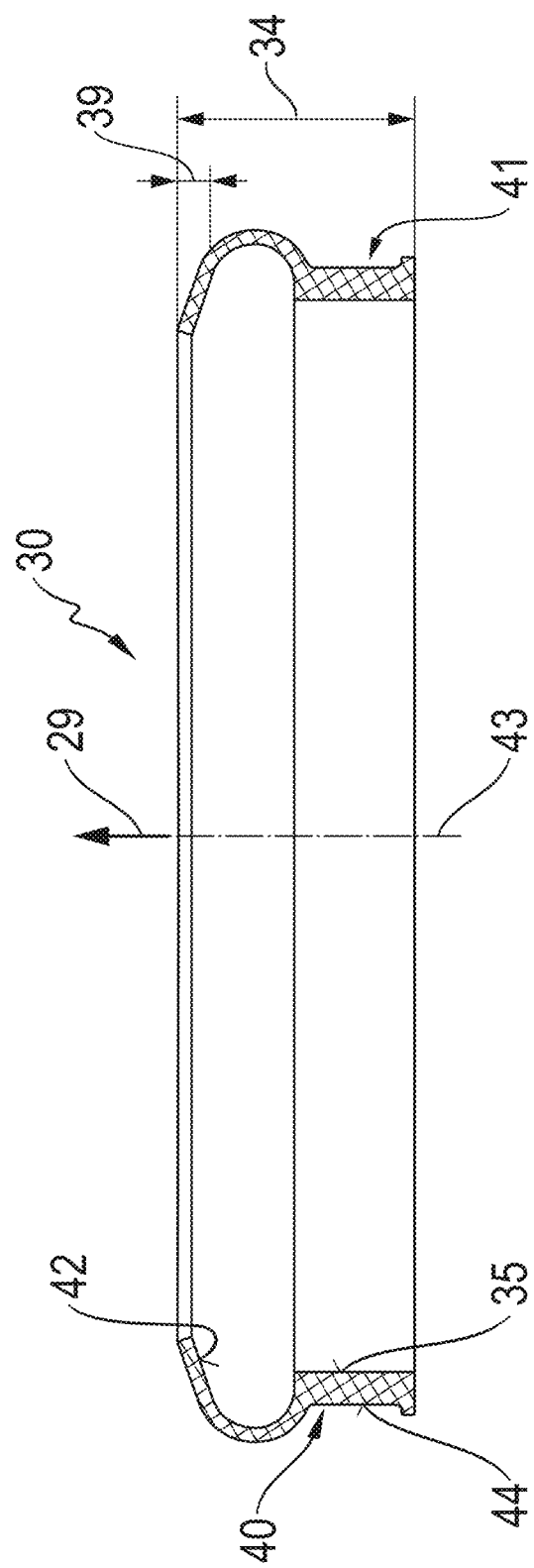
FIG. 4 shows a sectional view of the bellows protection from FIG. 3.

FIG. 4 shows the bellows protection 30 for partially surrounding the seal bellows 25 as an individual part. The bellows protection 30 is configured by itself to be contoured in axial direction 29 of the ball joint 20. The bellows protection 30 is constructed to be dimensionally stable and elastic at the same time and is constructed so as to be rotationally symmetrical with reference to its center axis 43 extending in axial direction 29 of ball joint 20. Further, the bellows protection 30 which is produced from polyurethane by injection molding is constructed with undercutting in axial direction 29 of ball joint 20 and has at its outer circumferential surface 44 two mold release fins 40, 41 extending in axial direction 29. The mold release fins 40, 41 are arranged at the outer circumferential surface 44 of the bellows protection 30 facing one another in radial direction and extend in a mold separation plane which passes through the center axis 43 of the bellows protection 30 and which is congruent with the drawing plane. The encircling area 34 extends in axial direction 29 of ball joint 20 over the entire height of the bellows protection 30. The inner circumferential surface 42 of the bellows protection 30 contacts the seal bellows 25 by the stud-side end portion 39. The housing-side end portion of the inner circumferential surface 42 is formed by the seal bellows contact region 35.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A ball joint for a vehicle comprising:
a housing having an opening;
a ball stud rotatably and pivotably mounted in the housing and including a shaft extending out of the opening of the housing;
a seal bellows for protecting the housing opening against unwanted penetration of dirt and/or moisture, the seal bellows comprising a shaft contact region and a housing contact region, wherein the seal bellows sealingly contacts the shaft with the shaft contact region on one end and sealingly contacts the housing with the housing contact region on another end, the seal bellows having an outer circumferential surface; and
a bellows protection having an inner circumferential surface, wherein the inner circumferential surface comprises a seal bellows contact region and an axial end portion;
wherein the seal bellows is surrounded in some areas by the bellows protection to prevent damage to the seal bellows due to mechanical influence, and
wherein the seal bellows contact region of the inner circumferential surface of the bellows protection bears against the outer circumferential surface of the seal bellows adjacent the housing contact region, and the axial end portion of the inner circumferential surface of the bellows protection bears against the outer circumferential surface of the seal bellows intermediate the housing contact region and the shaft contact region, so as to form a sealed gap between the seal bellows and the bellows protection at a location between the seal bellows contact region and the axial end portion in an unflexed condition of the seal bellows, and
the inner circumferential surface of the bellows protection being smaller than the outer circumferential surface of the seal bellows.

2. The ball joint according to claim 1, wherein the bellows protection surrounds the seal bellows in an encircling area extending in an axial direction of the ball joint in a direction of the shaft contact region proceeding from the housing contact region.

3. The ball joint according to claim 2, wherein the seal bellows and the bellows protection correspond to one another at least substantially with respect to a shape in the encircling area.

4. The ball joint according to claim 2, wherein the seal bellows comprises a bulged portion adjoining the housing and extending in the axial direction of the ball joint in the direction of the shaft contact region, the bulged portion being encircled by the bellows protection.

5. The ball joint according to claim 4, wherein the bellows protection is arranged along the bulged portion so as to be spaced apart from the seal bellows.

6. The ball joint according to claim 2, wherein the axial end portion of the bellows protection is circumferentially joined to the seal bellows by bonding, gluing or welding.

7. The ball joint according to claim 1, additionally comprising a clamping device and wherein the bellows protection is encircled by the clamping device so as to press the bellows protection and the seal bellows jointly against a circumferential contact region of the housing.

8. The ball joint according to claim 1, wherein the bellows protection is configured to be dimensionally stable and elastic at the same time.

9. The ball joint according to claim 1, wherein the bellows protection by itself is contoured in an axial direction of the ball joint.

10. The ball joint according to claim 1, wherein the seal bellows comprises a wall and wherein the wall of the seal bellows has a zigzag shape in some areas in an axial direction of the ball joint.

11. The ball joint according to claim 1, wherein the seal bellows and the bellows protection are produced from the same material.

12. The ball joint according to claim 1, wherein the bellows protection is made of a plastic with rubber-like characteristics.

13. The ball joint according to claim 1, wherein the bellows protection is made of a polyurethane.

* * * * *